(12) United States Patent
Starr (10) Patent No.: US 6,523,336 B2
(45) Date of Patent: Feb. 25, 2003

(54) COMBINATION GRASS MOWING AND ROLLING APPARATUS

(76) Inventor: Sherri L. Starr, 72 Coronado Shores, Lincoln City, OR (US) 97367

( * ) Notice: Subject to any disclaimer, the term of this patent is extended or adjusted under 35 U.S.C. 154(b) by 0 days.

(21) Appl. No.: 09/788,146

(22) Filed: Feb. 16, 2001

(65) Prior Publication Data

US 2001/0039788 A1 Nov. 15, 2001

Related U.S. Application Data

(60) Provisional application No. 60/103,199, filed on Feb. 17, 2000.

(51) Int. Cl.$^7$ ................................................ A01D 34/46

(52) U.S. Cl. ...................... 56/156; 56/DIG. 18; 56/253; 56/198

(58) Field of Search ........................ 56/12.1, 198, 199, 56/201, 156, 249, 250, 253, 254, 294, DIG. 6, DIG. 18; 280/47.371, 47.315

(56) References Cited

U.S. PATENT DOCUMENTS

| | | | | |
|---|---|---|---|---|
| 296,759 A | * | 4/1884 | Lacasse | 56/201 |
| 599,208 A | * | 2/1898 | White | 56/249 |
| 821,987 A | * | 5/1906 | Coldwell | 56/253 |
| 975,617 A | * | 11/1910 | Hill | 56/11.2 |
| 1,816,980 A | * | 8/1931 | Lontz | 56/249 |
| 2,214,501 A | * | 9/1940 | Kinkead | 56/15.9 |
| 2,253,924 A | * | 8/1941 | Worthington | 56/253 |
| 2,965,386 A | * | 12/1960 | Buske | 280/47.371 |
| 3,576,097 A | * | 4/1971 | Speiser | 56/249 |
| 4,127,980 A | * | 12/1978 | Ferguson | 56/11.3 |

OTHER PUBLICATIONS

Sims & Jeffries, Ltd., Ransomes Green Mowers, advertising brochure, Circa 1957, U.K.
McLane Manufacturing, Inc., "Greens Reel Lawn Mower," print ad, Mar.–Apr., 1997, USA.
National Croquet Calendar, "It's About Time," promotional piece, Mar.–Apr. 1997, USA.
Twin Start International, LTD., advertising brochure—"Greens–Mower," Dec., 1998, USA.
Hudson Sales & Engineering, Inc., "Hudson–Star Series I Greens Mower," advertising brochure, Mar., 1999, USA.
www.hudsonstar.com website page, Dec. 3, 1999.
Hudson Sales & Engineering, Inc., "Hudson–Star Greensmower Series 1," Owner's Manual, copyrighted 1999, USA.

* cited by examiner

*Primary Examiner*—Thomas B. Will
*Assistant Examiner*—Meredith C. Petravick
(74) *Attorney, Agent, or Firm*—Bingham McHale LLP (57) ABSTRACT

An apparatus for mowing and rolling grass comprising a lower mowing-rolling unit, a handle coupled to the mowing rolling unit and securable in two or more positions, a first of the two or more positions for performing grass mowing operations, a second of the two or more positions for performing grass rolling operations, the lower unit comprising a rear driving assembly, a front roller assembly, a grass-cutting assembly interposed between the front roller assembly and the rear driving assembly, and a drive-train gear assembly coupling the rear driving assembly to the grass-cutting assembly for rotatingly driving the grass-cutting assembly during forward movement of the apparatus, the drive-train gear assembly comprising a first drive gear, a second transducer gear, a drive shaft and a third gear secured to said first drive shaft, whereupon forward movement of the apparatus drives the first drive gear which in turn drives the second gear, the second gear in turn driving the third gear and the first drive shaft, thereby driving the grass-cutting assembly.

9 Claims, 8 Drawing Sheets

COMBINATION GRASS MOWING AND ROLLING APPARATUS

RELATED APPLICATIONS

This application claims priority on U.S. patent application Ser. No. 60/103,199, a provisional patent application filed Feb. 17, 2000.

TECHNICAL FIELD

This invention relates to apparatuses for mowing grass and, more particularly, relates to a manually operated, combination mowing and rolling apparatus intended to short mow and/or manicure grass found, for example, on a golf putting green or croquet court.

BACKGROUND ART

In view of the onslaught of domestic and resort club-type putting greens and croquet courts, there's a growing need for a practical, efficient and inexpensive means for maintaining the grass of such greens or courts. Such maintenance may include mowing, manicuring or rolling the grass. Typically, only golf courses, resort clubs or other larger facilities have the necessary equipment and personnel to maintain such grass. There is little available for a smaller facility, particularly a domestic putting green.

Conventional attempts to address this need include a greensmowing machine offered many years ago by Ransomes, a U.K. company. Ransomes's models are believed to be no longer in production. Another prior art attempt is currently offered by McLane Manufacturing, Inc., Paramount, Calif. McLane offers self-propelled and man-powered lawn mowers for such applications.

DISCLOSURE OF INVENTION

In accordance with the present invention, I provide a combination grass mowing and rolling apparatus comprising a lower unit assembly coupled to an upper handle assembly, which is securable in varying positions to accommodate the height of the operator and to facilitate the rolling of the grass as well. The alternate position of the handle assembly also facilitates the transporting and storage of the apparatus.

The lower unit assembly comprises a rear-drive-roller assembly, a front roller assembly, a grass-cutting reel interposed between the front and rear drive roller assemblies, a grass-catching assembly arranged adjacent the grass-cutting reel, a grass deflector for deflecting cut grass generated by the cutting reel to be collected in the grass-catching assembly, and a drive-train gear assembly coupling the rear drive-roller assembly to the cutting reel for providing rotational driving force to the cutting reel.

The rear drive-roller assembly includes a first roller positioned adjacent to a second roller, each of which is capable of independent movement relative to the other to better facilitate the turning of the device when in operation. The front roller assembly is further provided with means for adjusting the vertical height at which the grass is cut. The apparatus further includes means for resharpening the blades of the cutting reel.

An improvement over the prior art provided by my present invention is it serves as both a mowing device and a rolling device to manicure the grass in a smoothing action. This is accomplished by the upper handle assembly being movable between first and second positions to provide for, in a first position, for example, forward movement of the apparatus to mow or cut the grass, and in a second position to facilitate rolling the grass in a smoothing action or to allow the apparatus to be transported over the ground or similar surface. (For clarity, this second position is referred to as the "rolling-transport" mode.)

Other objects, advantages and novel features of the invention will become apparent from the following detailed description of the invention when considered in conjunction with the accompanying drawings.

BRIEF DESCRIPTION OF DRAWINGS

The foregoing and other features of the invention will be more particularly described in connection with the preferred embodiment and with reference to the accompanying drawings wherein.

BEST MODE FOR CARRYING OUT THE INVENTION

Figure 1:
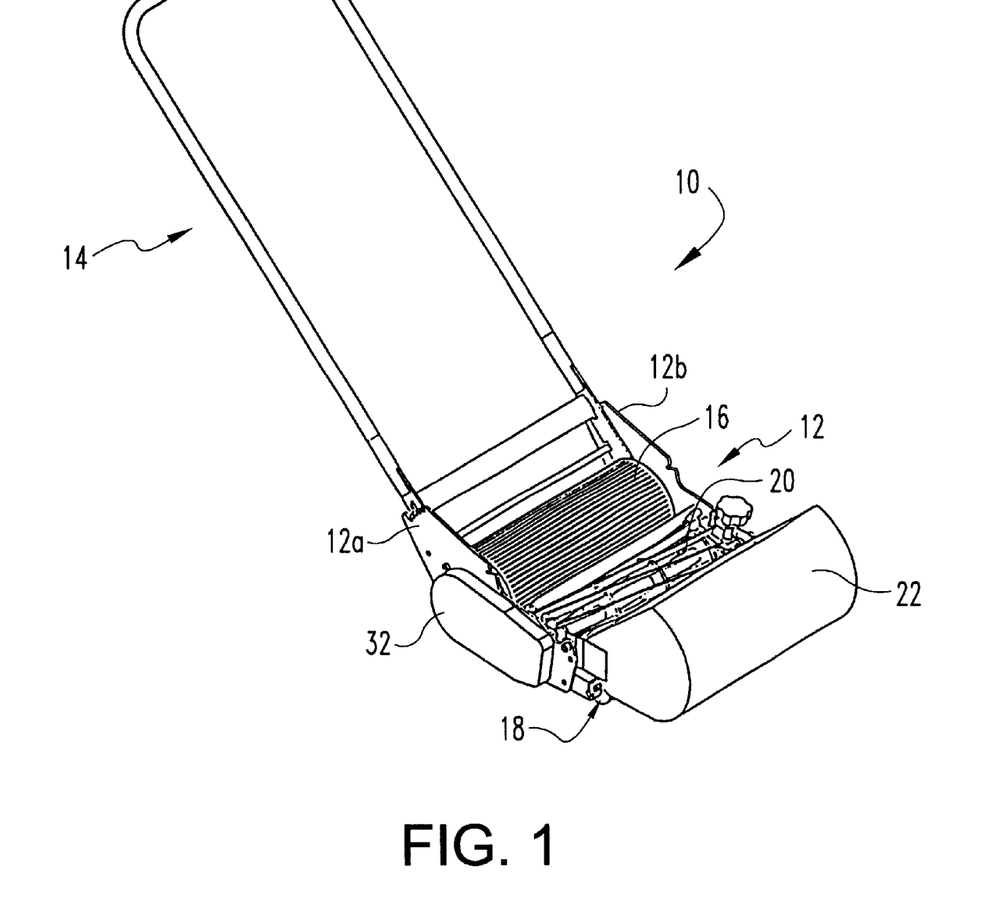
FIG. 1 is a perspective view of the apparatus provided by a preferred embodiment of the invention.
Figure 2:
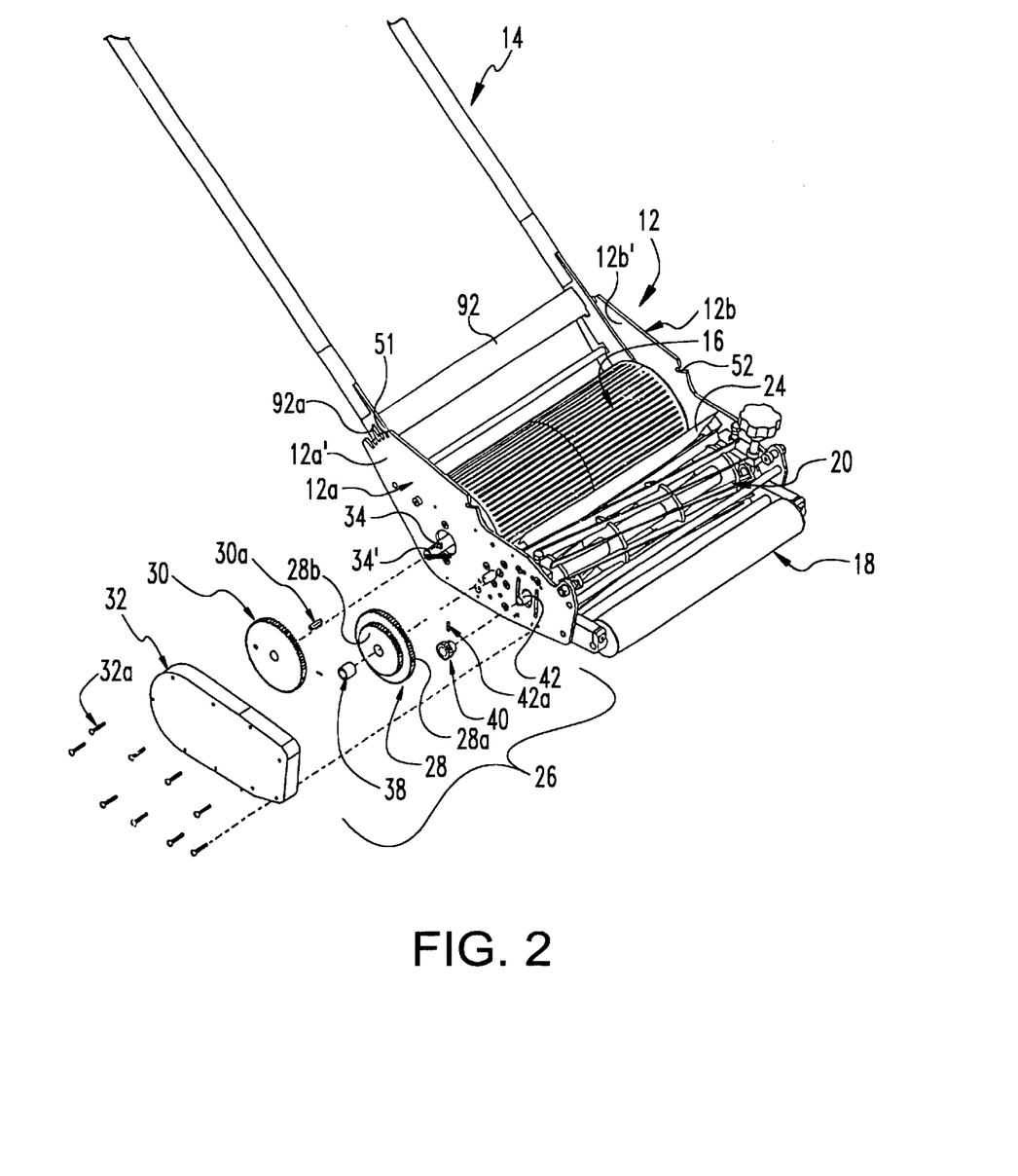
FIG. 2 is an enlarged view of the apparatus showing its drive gear assembly in an exploded fashion.

Referring now to the drawings wherein like reference numerals designate identical or corresponding parts or elements throughout the several views, FIGS. 1 and 2 show a preferred embodiment of this invention comprising an apparatus including a lower unit 12 and an upper handle assembly 14 pivotally coupled to the lower unit 12 such that the handle assembly is movable through varying positions. The lower unit assembly 12 comprises a rear drive-roller assembly 16, a front roller assembly 18, a grass-cutting reel 20 interposed between the front roller assembly 18 and rear roller assembly 16, a grass-catching assembly 22 arranged adjacent the grass-cutting reel 20, a grass deflector 24 for deflecting cut grass generated by the cutting reel 20 to the grass-catching assembly 22, and a drive-train gear assembly 26 coupling the rear drive roller 16 to the cutting reel 20 for providing a rotational driving force to the drive shaft 42 carrying the cutting reel 20.

The drive-train gear assembly 26 as shown in FIG. 2 includes a first main drive gear 30 that, upon movement of the apparatus 10, engages and turns a second transducer gear 28, which in turn engages and turns a third gear 40, which is fixedly secured to drive shaft 42 of the cutting reel 20. All of the gear assembly 26 is housed within a gear cover 32 adjacent the exterior of the side plate 12a of the lower unit 12. Gear cover 32 is fastened to side plate 12a by way of a plurality of conventional fasteners 32a. Main drive gear 30 is secured to rotate about a drive shaft 34 by way of a key 30a that is received within key slot 34' provided near the end of drive shaft 34. The transducer gear 28 is arranged in a journaled manner upon shaft 36 to rotate freely thereabout by way of bushing 38. The third gear 40 is fixed to rotate in cooperation with drive shaft 42 by way of roll pin 42a.

In operation, the rolling movement of rear drive roller assembly 16 rotates drive shaft 34, which in turn rotates drive gear 30. Drive gear 30 engages a first portion 28b of transducer 28, which is allowed to rotate freely about shaft 36. The rotational movement of the transducer gear 28 is then translated by way of its second gear portion 28a to the third gear 40, which in turn rotates drive shaft 42, thereby driving grass-cutting reel 20.

Figure 3:
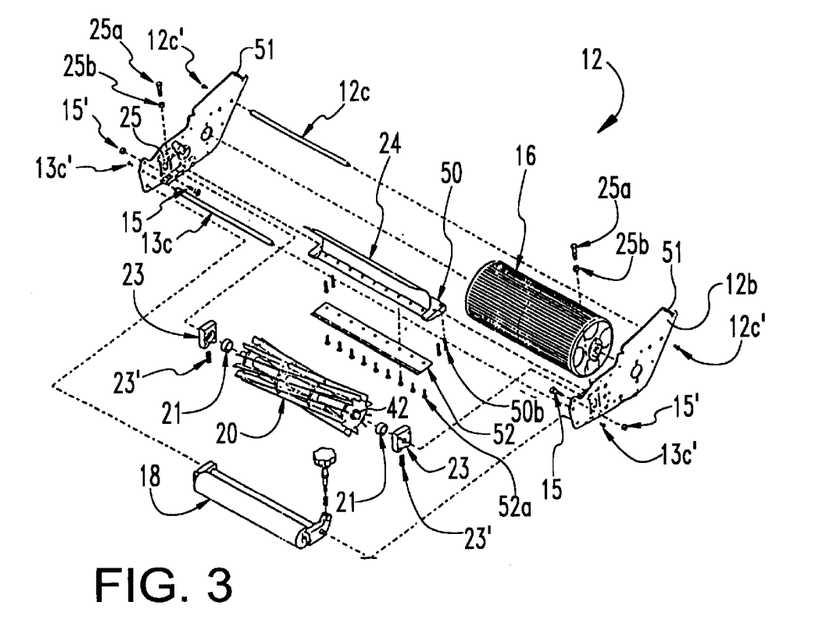
FIG. 3 is an exploded view of the lower unit assembly of this invention.

The lower unit assembly 12 is shown in an exploded view in FIG. 3, comprising the rear drive roller assembly 16 arranged between the side plates 12a, 12b, together with a spacer bar 12c extending also between the two side plates. Spacer bar 12c is secured in place at each of its ends by conventional fasteners 12c'. A second spacer bar 13c is provided forward of the reel 20 extending and secured between side plates 12a and 12b by conventional fasteners 13c'. For purposes of supporting the grass-catching assembly 22, as will be discussed below, a pair of shoulder bolts 15 are provided secured to the side plates by, preferably, nylon lock nuts 15'. While the shoulder bolts 15 are shown in FIG. 3 as extending inwardly, they may extend outwardly as well without impacting the effective operation of this invention.

Grass-cutting reel 20 rotates about its drive shaft 42 that extends at each end through bearings 21, which in turn rotate within bearing blocks 23. Bearing blocks 23 are secured to the interior side of each side plate 12a and 12b and rest within a bracket 25 affixed to the interior side of each side. A bolt 25a extends through each side plate and, in conjunction with hex nut 25b, secures the bearing block therewithin. A spring 23' is disposed within the block 23 to constantly urge the drive shaft 42 carrying the cutting reel upwardly to maintain a gap between the blades and a bed knife 52 (preferably about 0.002 inches) and prevent the shaft from gradually slipping downwardly to a point where the blades of the cutting reel would come into contact with the bed knife during rotation.

The lower unit assembly 12 further includes a grass deflector 24 secured to a bed knife holder 50 and the bed knife 52 by way of a plurality of fasteners 52a. Bed knife holder 50 is secured to extend between the side plates 12a and 12b by being secured to ledge abutment 50a by fasteners 50b. Bed knife 52 provides, in conjunction with the cutting blades, the shearing action that cuts the grass in a manner similar to a pair of scissors. In a preferred embodiment, bed knife 52 is specially designed to be much thinner than conventional bed knifes used in conventional rotary mowers. This enables the apparatus of this invention to cut grass as short as ⅛ inch.

Figure 4A:
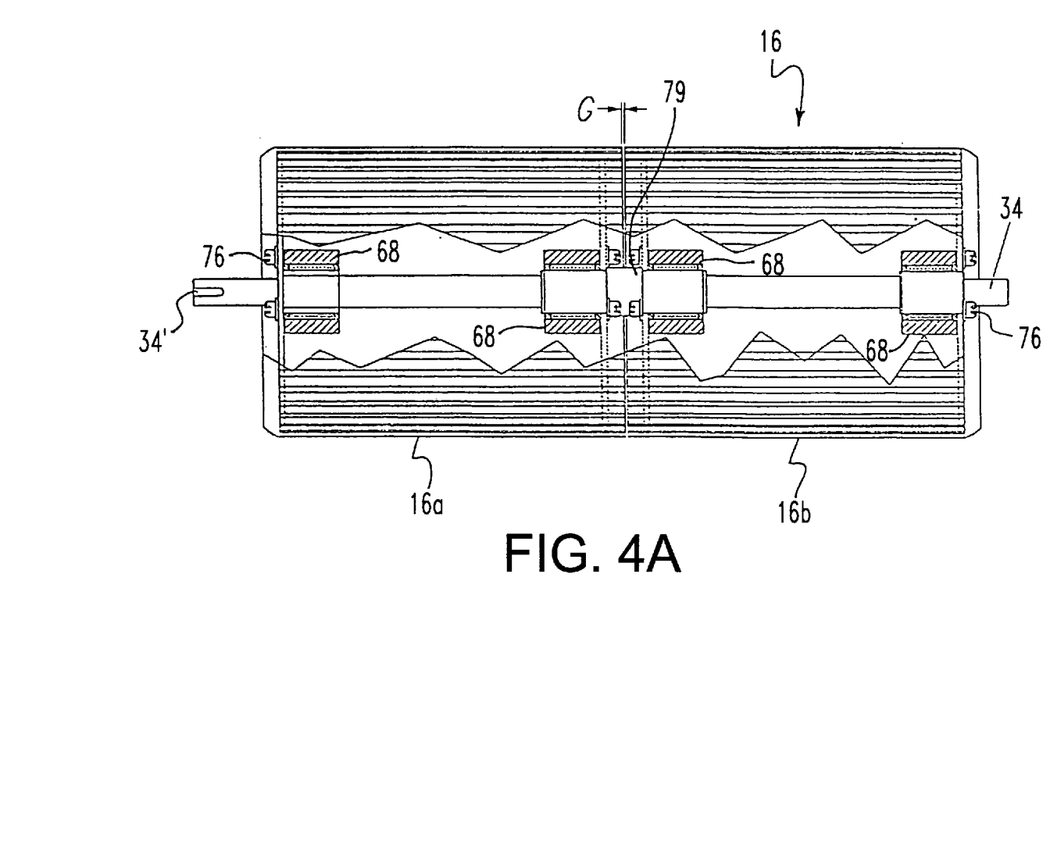
FIG. 4A is a top plan view, with partial cross section, of the rear drive roller assembly of the invention.
Figure 4B:
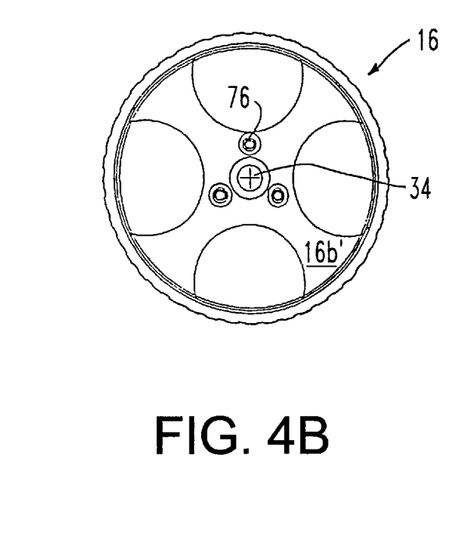
FIG. 4B is a side plan view of the rear drive roller assembly of FIG. 4A.
Figure 5:
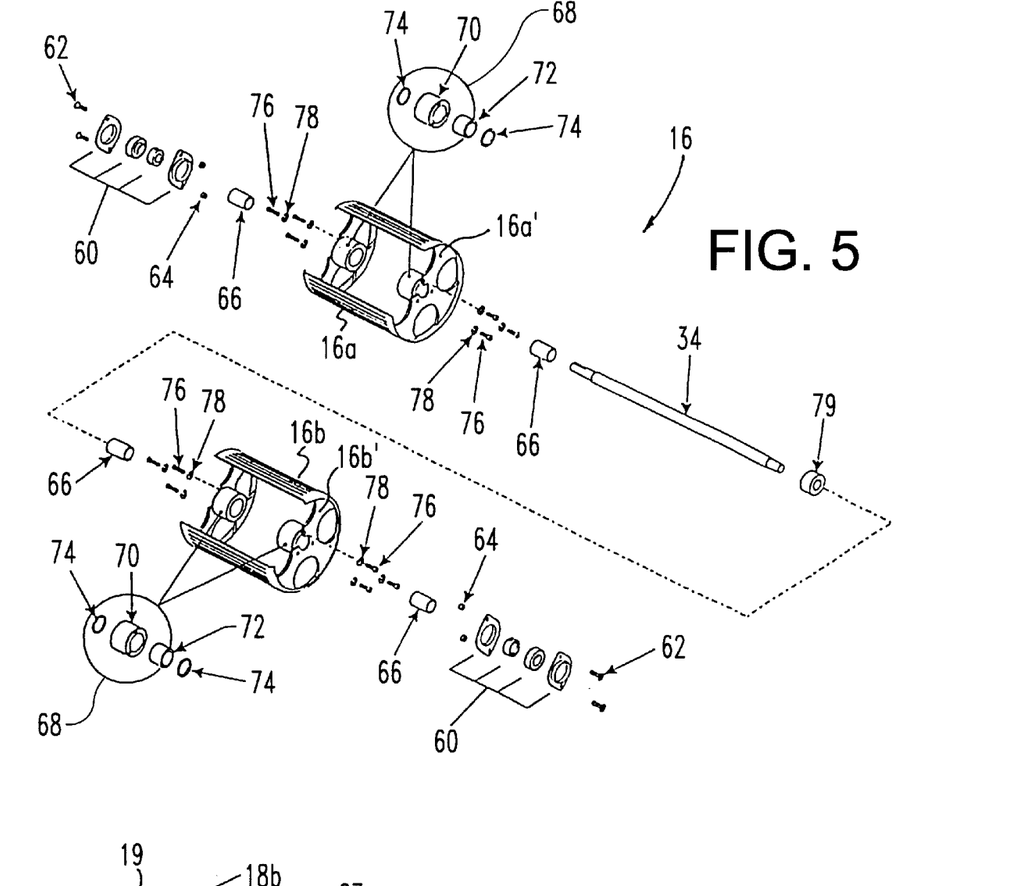
FIG. 5 is an exploded view of the first and second rollers of the rear drive roller assembly of FIGS. 4A and 4B.

Referring now to FIGS. 4A, 4B and 5, the rear drive assembly 16 is shown with partial cut away to show its inner components. Drive roller assembly 16 includes a first roller 16a positioned closely adjacent a second roller 16b, with a gap "G" therebetween of, preferably, about 0.06 inches. Drive shaft 34 is of a single-piece construction and extends completely through both rollers 16a and 16b. (For purposes of clarity, the first and second roller 16a and 16b are shown in FIG. 5 in partial cut-away fashion.) Secured to the outer side of rollers 16a and 16b is a bearing assembly 60 secured by way of fastener 62 and, preferably, nylon lock nut 64. A bearing sleeve 66 is then provided disposed interiorly of each roller 16a and 16b. Inside of each roller is a pair of clutch bearing assemblies 68 secured to the side walls 16a' and 16b' of first and second rollers 16a and 16b, respectively. Each bearing housing assembly 68 preferably includes a bearing housing 70 through which rests a bearing 72, sealed at each end by a pair of seals 74. Each bearing housing assembly 68 is secured to its respective sidewall 16a' or 16b' by fasteners 76. To maintain a secured engagement of the bearing housing assembly 68, a lock washer 78 may be employed. The clutch bearings 68 allow the apparatus 10 and, hence the rear drive roller assembly 16, to be moved in the reverse direction while the cutting reel 20 is permitted to continue its forward rotational movement freely without power.

To maintain the gap G between the first and second rollers 16a, 16b, a spacer 79 is arranged about drive shaft 34 between the two rollers. As shown in FIG. 4A, drive shaft 34 is provided with a key slot 34' at one end to receive the key 30a (FIG. 2) to provide for the fixed rotation of the drive gear 30 in conjunction with shaft 34.

Figure 6A:
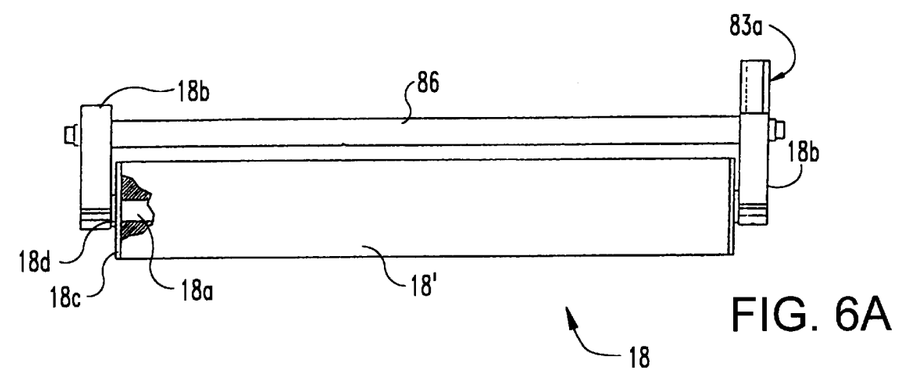
FIG. 6A is a top plan view of the front roller assembly of this apparatus shown in isolation.
Figure 6B:
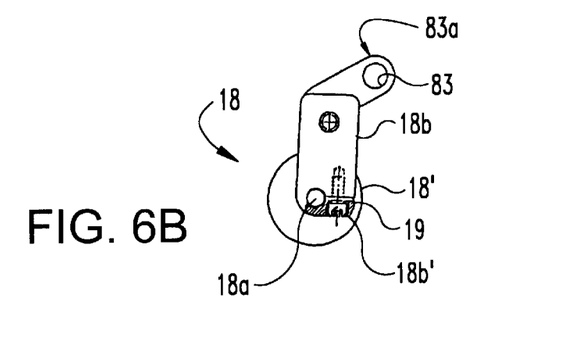
FIG. 6B is a side plan view of the front roller assembly of FIG. 6A.
Figure 7:
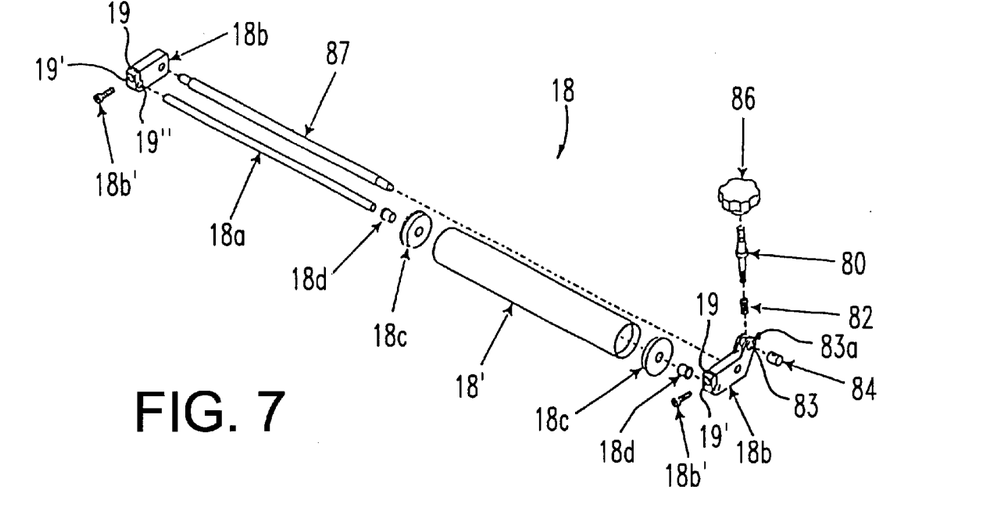
FIG. 7 is an exploded view of the front roller assembly of FIG. 6A shown in isolation.

Front roller assembly 18 is shown in FIGS. 6A, 6B and 7, comprising a roller 18' freely rotating about a shaft 18a extending between opposing weldments 18b and 18c. Disposed within the central opening of roller end caps 18c is a bushing 18d. At one end of the drive roller assembly 18, the front roller weldment 18b may be defined by a pivot block having a slot opening 19 provided therein and a threaded opening 19' extending across the slot 19 into the main portion of the body of block 18b. The near end of shaft 18a is received within an opening 19" provided in block 18. A threaded fastener 18b' is then received within opening 19' and, upon tightening, securely clamps the end of shaft 18a within the block 18b.

At the opposing end of the roller assembly 18, that weldment 18b may be defined by an adjusting block adapted to receive an adjusting screw 80 which extends down through a spring 82, which collectively in turn extend downwardly through a yoke portion 83a extending upwardly from the block 18b. A clevis 84 extends through a pair of openings 83 provided in the yoke 83a and secures the lower end of the adjusting screw 80 within the adjustment block 18b.

Attached to the upper end of the adjusting screw 80 is a hand knob 86. Also extending between the two opposing weldments 18b is a spacer bar 87 to add further rigidity to the front roller assembly 18. The end of the shaft 18a nearest that end is secured within the adjustment block in a clamping manner similar to that at the opposing end by way of threaded fastener 18b' being received within opening 19'.

The adjustment means provided by adjusting knob 86 may be activated manually to lower or raise the height at which the grass is cut. In a preferred embodiment, turning the adjustment knob 86 counter-clockwise lowers the cutting height; while turning the knob clockwise raises the cutting height. The height is adjustable from about ⅛ inch to about ⅜ inch. Each complete turn of the knob raises or lowers the cutting height approximately ¹⁄₃₂ inch.

Figure 8A:
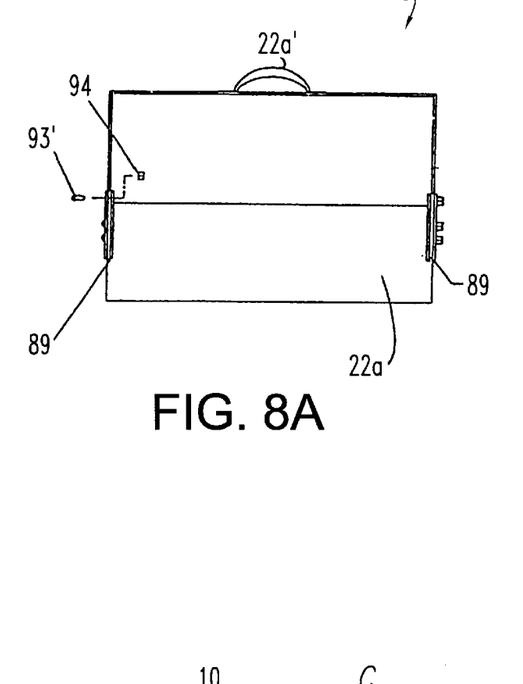
FIG. 8A is a top plan view of the grass catching assembly of this invention.
Figure 8B:
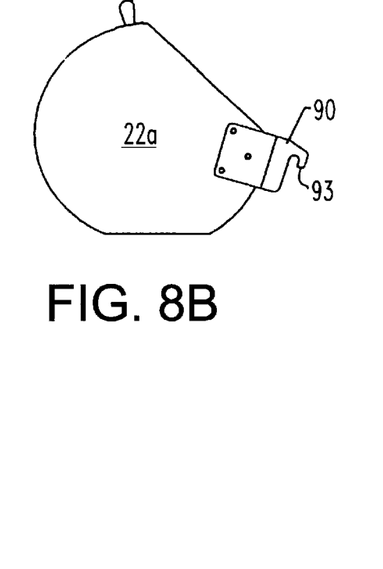
FIG. 8B is a side plan view of the grass catching assembly of FIG. 8A.

Referring now to FIGS. 8A and 8B, grass-catching assembly 22 is shown comprising a grass catcher 22a having a pair of brackets 89 affixed to its sides by way of a plurality of fasteners 93' and lock nuts 94. The grass-catching assembly 22 is releaseably positioned adjacent the front roller assembly 18 of the mowing apparatus 10 by engaging dog or hook portions 93 of the brackets 89 about the shoulder bolts 15 (FIG. 3) extending inwardly from the side plates 12a and 12b. In use, the grass catcher 22a may simply be disengaged from the lower mower unit assembly 12 by the operator grasping the handle 22a' and lifting and disengaging the hook portions 93 of brackets 89 up and away from the shoulder bolts 15. The loose grass clippings may then simply be emptied from the grass catcher 22a, and the grass catcher replaced upon the shoulder bolts 15 ready for subsequent operation.

Figure 9:
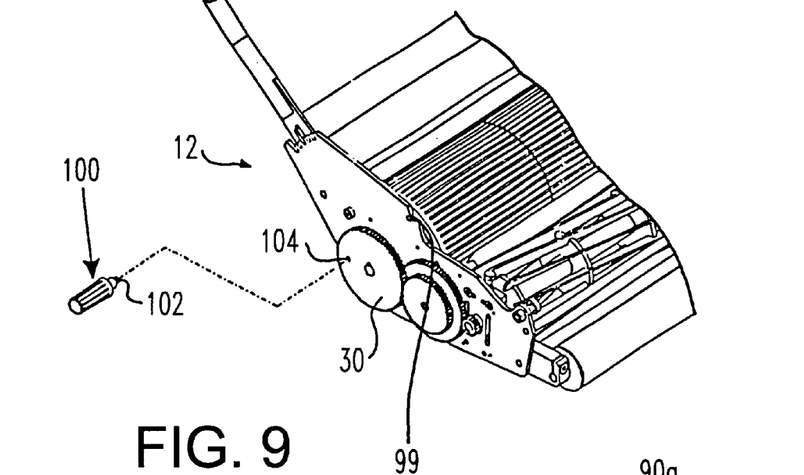
FIG. 9 is a partial perspective view of the means provided by the apparatus by which the blades of the cutting reel may be resharpened.

The means by which the blades of the cutting reel may be resharpened is shown in FIG. 9 where a blade sharpening handle 100 is provided with a male threaded end 102 adapted to be received in a tapped opening 104 provided in the flat surface of drive gear 30. Upon the mower 10 being secured and the rear roll assembly 18 allowed to turn freely, the gear cover 32 (not shown in FIG. 9) is removed and the handle 100 is threaded into tapped hole 104 in the drive gear 30 and tightened. The handle 100 is then turned slowly counterclockwise while a lapping compound is applied to the blades on the cutting reel. (Because of the clutch bearing within the rollers 16a and 16b, the reverse movement of drive gear 30 does not turn the rollers.

Figure 10:
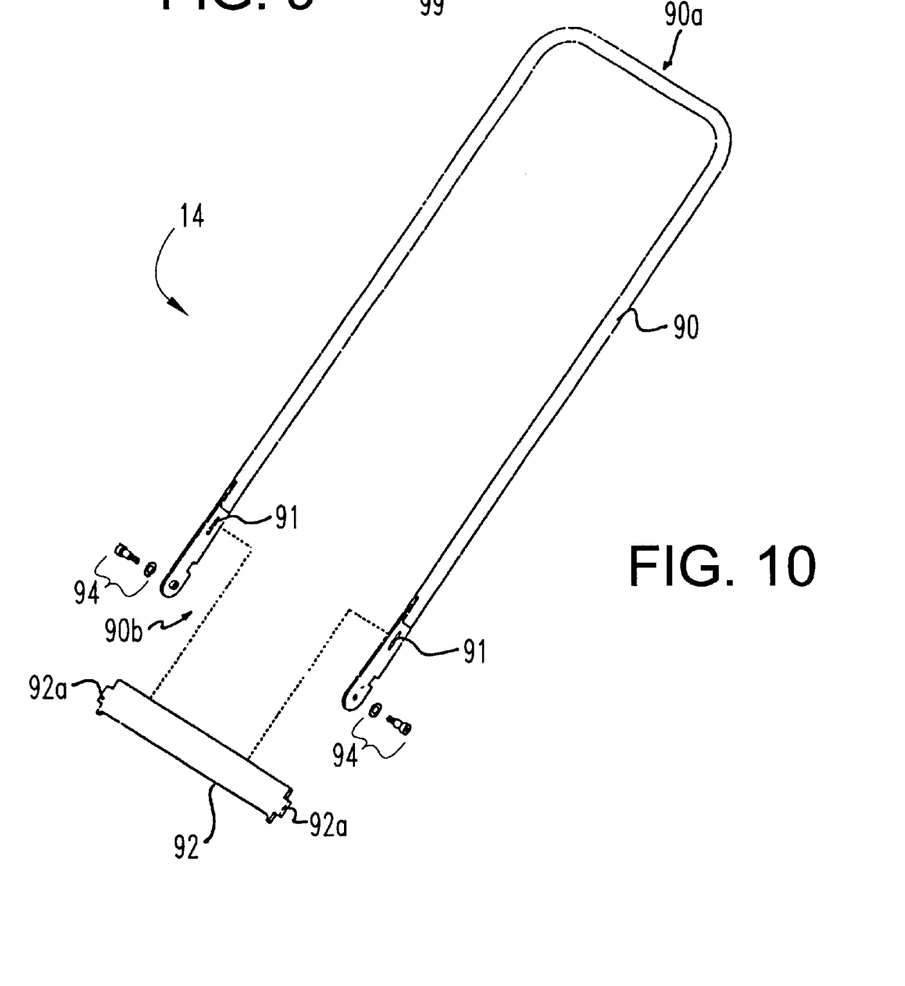
FIG. 10 is an exploded view showing in isolation the upper handle assembly of the apparatus.
Figure 11:
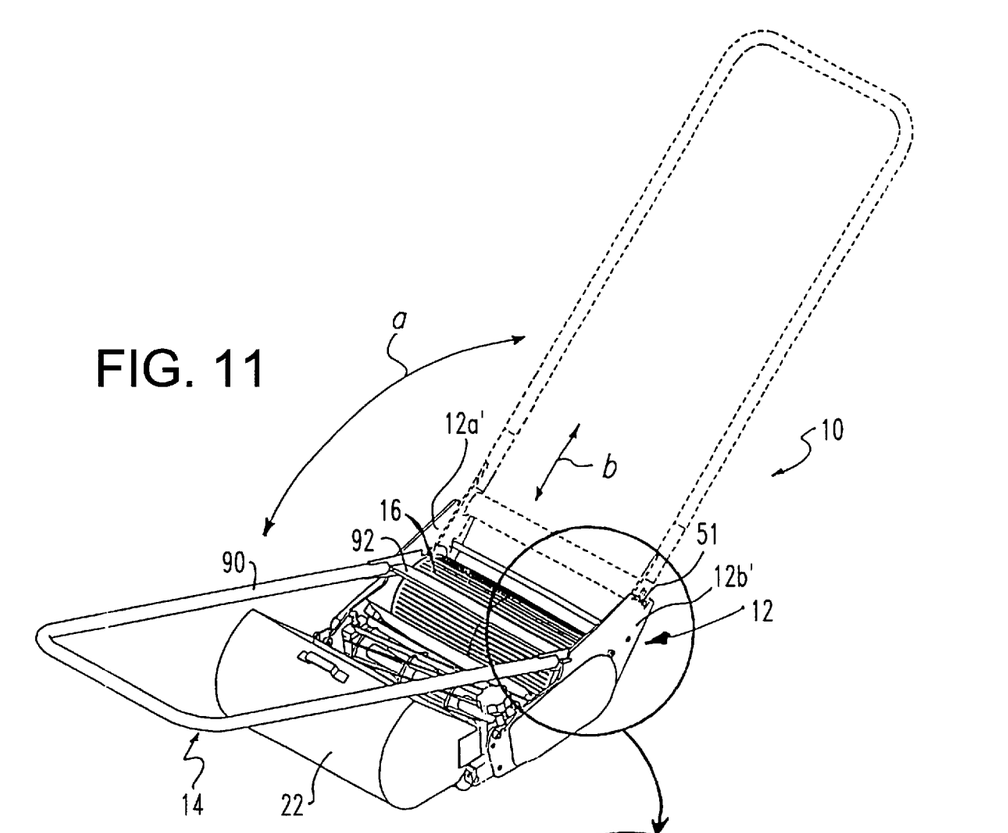
FIG. 11 is a perspective view of the invention showing the alternative positions of the upper handle assembly.
Figure 12:
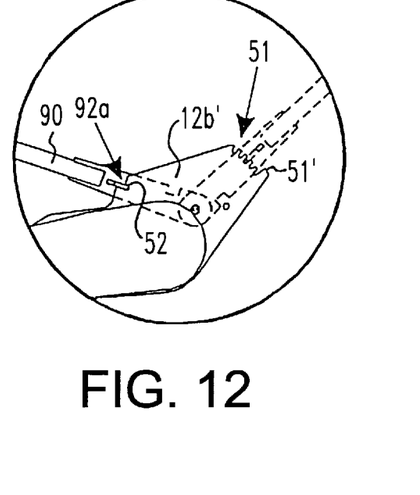
FIG. 12 is an enlarged, isolated view of the means by which the upper handle assembly may be releasably engaged to the lower unit assembly at varying positions.
Figure 13:
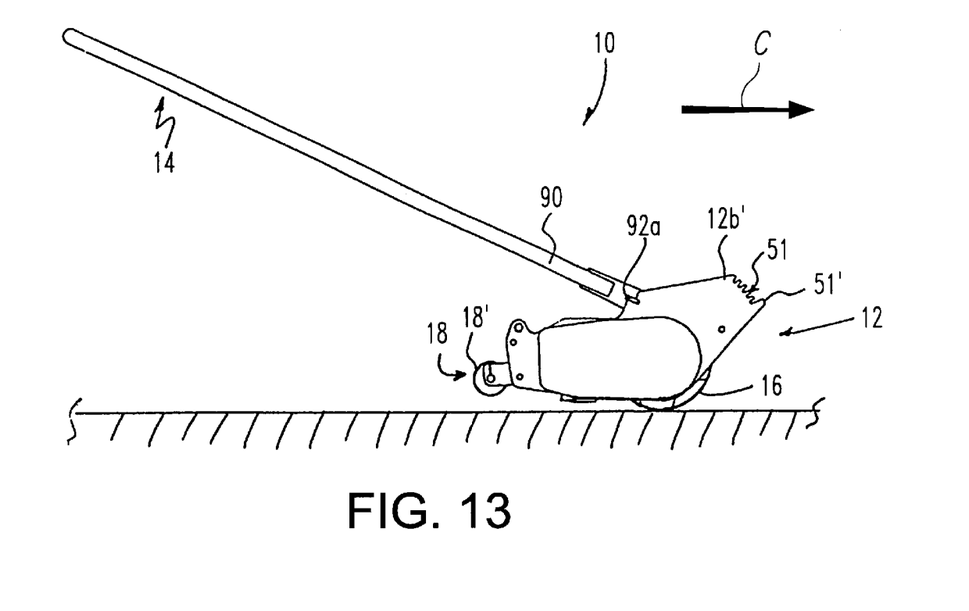
FIG. 13 is a side plan view of the apparatus of this invention configured in the rolling-transport mode.

FIG. 10 shows the upper handle assembly 14 comprising a U-shaped member 90 closed at one end 90a (the upper end when in use) and opened at its other end 90b (the lower end when in use), a height-adjusting cross bar 92 extending between the two lateral portions of handle 90 adjacent open end 90b, and a pair of shoulder bolts and washer assemblies 94 for securing the handle 90 to the lower unit assembly 12 at the upper end portion of the side plates 12a and 12b as shown best in FIGS. 11 and 12. Handle 90 includes protrusions or extensions 92a defined by the protruding ends of height-adjusting bar 92 (see FIG. 10) that are received through slots 91 provided in the handle 90 adjacent its open end 90b. The dimension of protrusions 92a are smaller than the opening 91 (considered lengthwise) so that the bar 92 may ride freely up and down a slight distance within the slots 91.

Referring now to FIGS. 11 and 12, the handle assembly 14 and handle member 90 are movable between a first mowing position and a second rolling-transport position as shown by reference arrow "a." When in the mowing position (shown in phantom in FIGS. 11 and 12), the extensions 92a of bar 92 are received within one of multiple slots S1 provided in the upper protruding portion 12a' and 12b' of the side plates 12a and 12b, respectively, of the lower unit 12 (i.e. means cooperating with said height-adjusting cross member for locking said height-adjusting cross member into a said at least two positions). Adjacent the lowest slot is a stop member S1' beyond which the extensions 92a may not move, even when at the point of maximum upward displacement within the slots 91 of the handle. In a preferred embodiment, the operator may adjust the handle to one of five positions for the most comfortable operating height by moving the height-adjusting bar 92 upwardly, as shown by reference arrow "b" in FIG. 11, a sufficient distance to allow the extensions 92a to move upwardly out of and disengage from the original slot. When the handle 90 is at the desired height for the operator, the bar 92 is lowered, thereby engaging one of the slots S1 with the extensions 92a to releasably secure the handle 90 in that position. When it is necessary to roll the grass in a smoothing fashion or to simply transport or move the apparatus from one location to another (for example, from a garage or storage facility to the area to be mowed), the position of the handle assembly 14 may be changed (swung from the mowing position to the rolling-transport position) to allow the mower to travel upon its rear roller assembly 16 only, as depicted in FIG. 12 and reference arrow "c." To move the handle to the is rolling-transport position, the height-adjusting bar 92 is raised, thereby disengaging the protrusions 92a from their position within one of the slots S1. The handle 90 is then moved or swung forwardly until the protrusions 92a come into contact with abutment 99 (see FIG. 9), at which point the height-adjusting bar is lowered such that the protrusions 92a engage and are received within the rolling-transport position slots S2. During the rolling of the grass or the transporting of the apparatus, the front roller 18' and the cutting reel 20 should be off the ground to prevent damage.

Although the present invention has been described with a preferred embodiment, it is to be understood that variations and modifications may be made without departing from the scope of this invention as set forth in the following claims. Such variations and modification are considered to be within the purview and scope of the appended claims.

I claim:

1. An apparatus for mowing grass comprising:
   a lower unit assembly; and
   an upper handle assembly coupled to said lower unit assembly,
   said handle assembly being securable in at least two positions, a first of said two or more positions intended to effect a grass mowing operation,
   said lower unit comprising a rear driving assembly, a front roller assembly, a grass-cutting assembly interposed between the front roller assembly and the rear driving assembly, and a drive-train gear assembly coupling the rear driving assembly to the grass-cutting assembly for rotatingly driving said grass-cutting assembly during forward movement of the apparatus;
   wherein said upper handle assembly comprises a U-shaped member having an open end, a closed end and two lateral portions, a height-adjusting cross member extending between the two lateral portions of said U-shaped member, and means cooperating with said height-adjusting cross member for locking said height-adjusting cross member into a said at least two positions, the opposing ends of said cross member being slidably received within the lateral portions of said handle, the closed end of said handle defining an upper end when the apparatus is in use and the open end being pivotally secured to said lower unit.

2. The apparatus as in claim 1 wherein said lower unit assembly includes means allowing for said handle to be releasably positioned in a plurality of positions while said apparatus is still in a grass-mowing mode.

3. The apparatus as in claim 2 wherein said lower unit assembly including two or more slots for slidably receiving an end of the cross member of said upper handle assembly to releasably secure the upper handle assembly in the first position.

4. The apparatus as in claim 1 wherein said lower unit assembly including means allowing for said handle to be releasably secured in the second position after the handle has been moved from the first position to the second position.

5. The apparatus as in claim 1 wherein the front roller assembly of said apparatus is adapted to engage the ground surface upon which the apparatus travels when the upper handle assembly is in the first position and the apparatus moves in a first grass mowing direction.

6. The apparatus as in claim 4 wherein said lower unit assembly includes at least one slot for slidably receiving an end of the cross member of said upper handle assembly to releasably secure the upper handle assembly in the second position.

7. The apparatus as in claim 5 wherein the front roller assembly of said apparatus is adjusted to be disposed a slight distance from and to avoid engagement of the ground surface upon which the apparatus travels when the upper handle assembly is in the second position and the apparatus moves in a second rolling direction, said second rolling direction being opposite from the first grass mowing direction.

8. The apparatus of claim 1 wherein the means cooperating with said height-adjusting cross member for locking said height-adjusting cross member into a said at least two positions is a plurality of slots formed into said lower unit.

9. The apparatus of claim 8 wherein said lower unit further comprises a pair of side plates connected thereto and at least partially enclosing said rear driving assembly, said front roller assembly, said grass-cutting assembly and said drive-train gear assembly and wherein said plurality of slots is formed in each of said side plates.

\* \* \* \* \*